United States Patent [19]

Brewer

[11] Patent Number: 4,991,302

[45] Date of Patent: Feb. 12, 1991

[54] OPEN CIRCUIT LEVELING MEASURING SYSTEM

[76] Inventor: Aubrey W. Brewer, 6927 Twin Creek Rd., Knoxville, Tenn. 37920

[21] Appl. No.: 375,863

[22] Filed: Jul. 5, 1989

Related U.S. Application Data

[63] Continuation-in-part of Ser. No. 161,984, Feb. 29, 1988, abandoned.

[51] Int. Cl.[5] .......................... G01C 5/04; G01C 9/22
[52] U.S. Cl. ....................................................... 33/367
[58] Field of Search ........................................... 33/367

[56] References Cited

U.S. PATENT DOCUMENTS

| | | | |
|---|---|---|---|
| 375,450 | 12/1887 | Karr | 33/367 |
| 386,924 | 7/1988 | Kegel | 33/367 |
| 915,084 | 3/1909 | Eberhard | 33/367 |
| 1,012,993 | 12/1911 | Dissett | 33/367 |
| 1,042,248 | 10/1912 | McGowan | 33/367 |
| 2,614,572 | 10/1952 | Wisney | 33/367 X |
| 3,132,428 | 5/1964 | Haissig et al. | 33/367 |
| 3,310,880 | 3/1967 | Watts | 33/367 |
| 4,686,773 | 8/1987 | Brewer | 33/367 |

FOREIGN PATENT DOCUMENTS 0086866 10/1920 Switzerland .................... 33/367

*Primary Examiner*—Daniel M. Yasich
*Attorney, Agent, or Firm*—Pitts & Brittian

[57] ABSTRACT

An open circuit measuring system (10) for discerning the vertical distance between selected locations is provided. The system includes first and further members, each having a base portion (14) with a bottom (16), and an upright tube (18) which contains liquid. The tube (18) is open at its top, and extends upwardly from the base portion (14). Fluid communication is provided between the tubes proximate their lower portions (22). A scale is carried by the tubes along their lengths, such that a user can discern, as marked by the level of liquid in the tube (18), the distance in selected units of measure between the bottoms of the first and further base portions.

6 Claims, 4 Drawing Sheets

OPEN CIRCUIT LEVELING MEASURING SYSTEM

This is a continuation-in-part application based upon parent application Ser. No. 161,984 filed Feb. 29, 1988 abandoned.

TECHNICAL FIELD

This invention relates to a measuring system, and more specifically concerns a system which measures the exact vertical displacement between two horizontally spaced locations.

BACKGROUND ART

In construction, and other applications, it is often important to know the vertical displacement between two selected and spaced locations. Typically, such vertical displacements are determined by the use of a tripod, surveyor's level, and rod which are used in a conventional manner to detect vertical displacements between a reference point and selected and spaced location. Measurements of this type are labor intensive operations. Further, it is not uncommon for inaccurate measurements to be taken, especially if the laborer is insufficiently trained.

Numerous liquid leveling systems have been developed in the past. Known prior art is illustrated in the following U.S. Pat. Nos.:

| PATENT NO. | INVENTOR | ISSUE DATE |
|---|---|---|
| 386,924 | A. Kegel | July 31, 1888 |
| 451,680 | A. Gamble | May 5, 1891 |
| 547,864 | Sherman | October, 1895 |
| 915,084 | R. Eberhard | March 16, 1909 |
| 965,659 | J. L. Russell | July 26, 1910 |
| 1,012,993 | J. H. Dissett | December 26, 1911 |
| 1,042,248 | W. N. McGowan | October 22, 1912 |
| 1,231,162 | I. Husby | June 26, 1917 |
| 2,532,883 | P. L. Bennett, et al. | December 5, 1950 |
| 3,015,167 | J. M. Chapman | January 2, 1962 |
| 3,132,428 | H. O. Haissig, et al. | January 12, 1962 |
| 3,137,091 | N. Clare, et al. | June 16, 1964 |
| 3,144,234 | K. Artmann | August 11, 1964 |
| 3,310,880 | A. W. Watts | March 28, 1967 |
| 3,680,216 | L. W. Hallanger | August 1, 1972 |
| 3,768,766 | A. O. Bain | October 30, 1973 |
| 3,910,576 | X. Leonhart | October 7, 1975 |

While these leveling systems, as a general rule, incorporate one or more liquid containing members, the systems generally are designed to provide a representation of whether two points are level, one with respect to the other.

Contrawise, the present invention includes as an object, a feature to measure the vertical displacement between selected and spaced locations.

It is another object of the present invention to provide a system for making vertical measurements which would normally be made by a builder's level, rod and tripod, and to enable making such measurement readily and accurately determinable by a single worker.

Another object of the present invention is to provide such a measuring system which can be readily manufactured and easily maintained, and which is readily portable.

DISCLOSURE OF THE INVENTION

Other objects and advantages will be accomplished by the present invention which provides an open circuit measuring system for measuring the vertical displacement between horizontally spaced locations. The system includes first and further cooperating measuring instruments each having a base portion with a bottom and an upright tube for containing a liquid. The tube is open at its top and upstanding from the respective base portion. Fluid communication is provided between the tubes proximate their lower portions. Each of the tubes serves as a measuring instrument which acts in conjunction with the level of the liquid contained therein such that a user can discern the distance, in marked units of linear measurement between the bottoms of the first and further base portions.

BRIEF DESCRIPTION OF THE DRAWINGS

The above-mentioned features of the invention will become more clearly understood from the following detailed description read together with the drawings in which.

BEST MODE FOR CARRYING OUT THE INVENTION

An open circuit measuring system incorporating various features of the present invention is illustrated generally at 10 in the figures. The measuring system 10 includes a first measuring instrument 12 which cooperates with a substantially identical measuring instrument 12' for measuring the vertical displacement between these instruments. For purposes of this description, like components and features on the first instrument 12 and further instrument 12' will be referenced with primed numerals. More specifically, the measuring instrument 12 includes a base portion 14 which defines a bottom 16 which is substantially flat in the preferred embodiment. This bottom 16 engages or rests upon a suitable supporting surface at a location upon which a vertical displacement measurement is desired with respect to the bottom 16' of instrument 12'.

Figure 1:
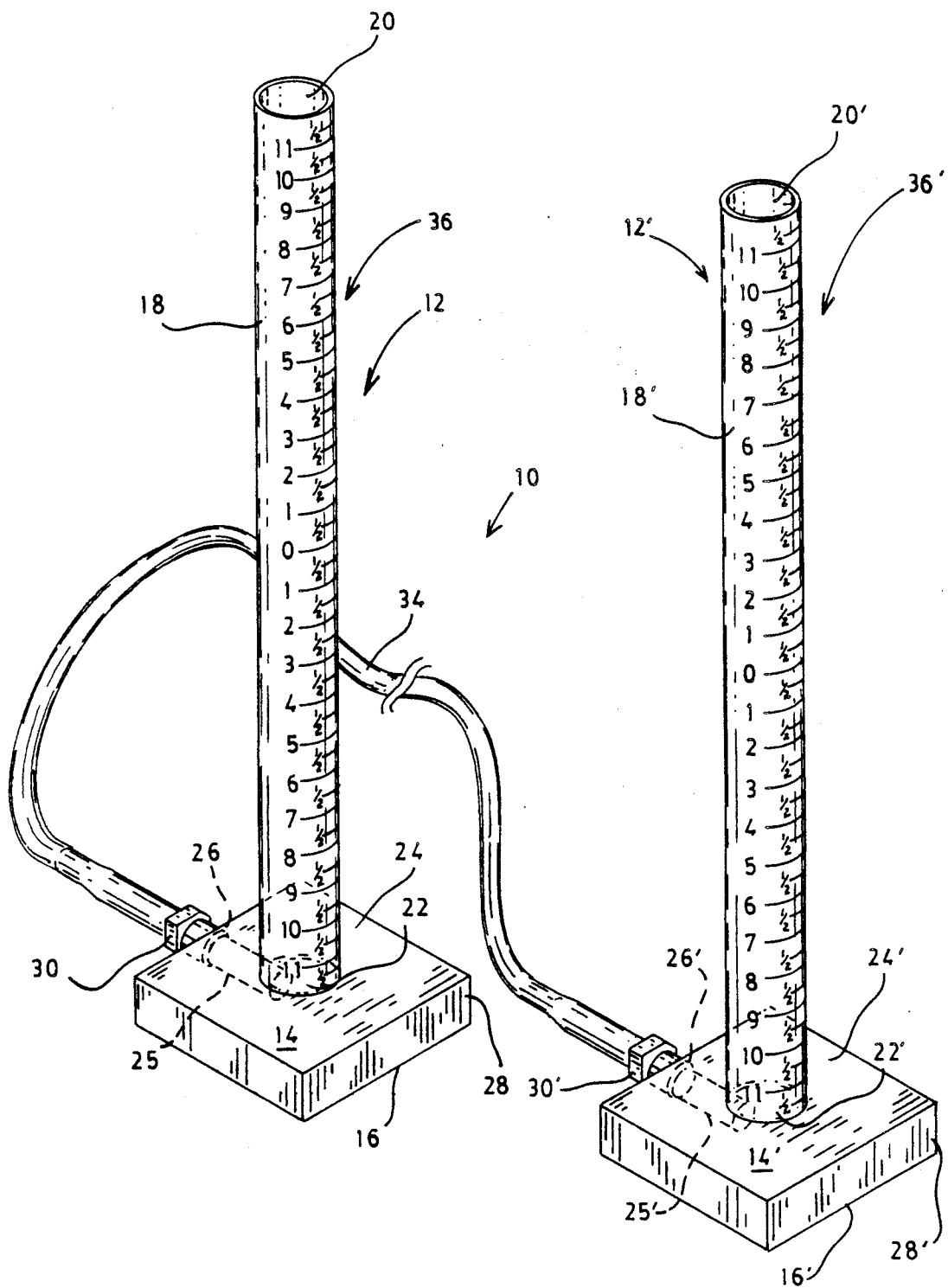
FIG. 1 illustrates a perspective view of an open circuit measuring system constructed in accordance with various features of the present invention.

The base portion 14 supports a reservoir which in the preferred embodiment comprises an upstanding tube 18 which is substantially cylindrical and defines a chamber 20 therein which receives a liquid such as water. The lower portion 22 of the tube 18 is secured proximate the upper surface 24 of the base portion 14, and extends into a recessed opening defined in the base portion 14. A bore 25 extends across the base portion 14 as illustrated in FIG. 1 and provides fluid communication with the recess receiving the lower portion 22 of the tube 18 and with the chamber 20 defined within the tube. Proximate the opening 26 of the bore 25 on the vertical wall 28 of the base portion 14, a suitable fitting or coupling 30 is provided.

Fluid communication is provided between the chambers 20 and 20' defined by the lower portions 22 and 22' of the tubes 18 and 18', respectively. In the illustrated embodiment, this fluid communication is provided by a flexible tube means 34 illustrated in FIG. 1. It will be noted that this tube means 34 includes a first end portion which is connected to the coupling 30 operatively associated with the base portion 14. The opposite end portion of the flexible tube 34 is mounted and connected to the coupling 30' operatively associated with the base portion 14'. It will be noted that connection of the flexible tube 34 in this manner provides fluid communication between the lower portions 22 and 22' of the tubes 18 and 18', respectively. More specifically, this fluid communication is provided through the tube 34, the coupling 30 and 30', and the associated bores 25 and 25' which lead into the lower portions of the tubes 18 and 18', respectively, and as shown in FIG. 1.

Figure 2:
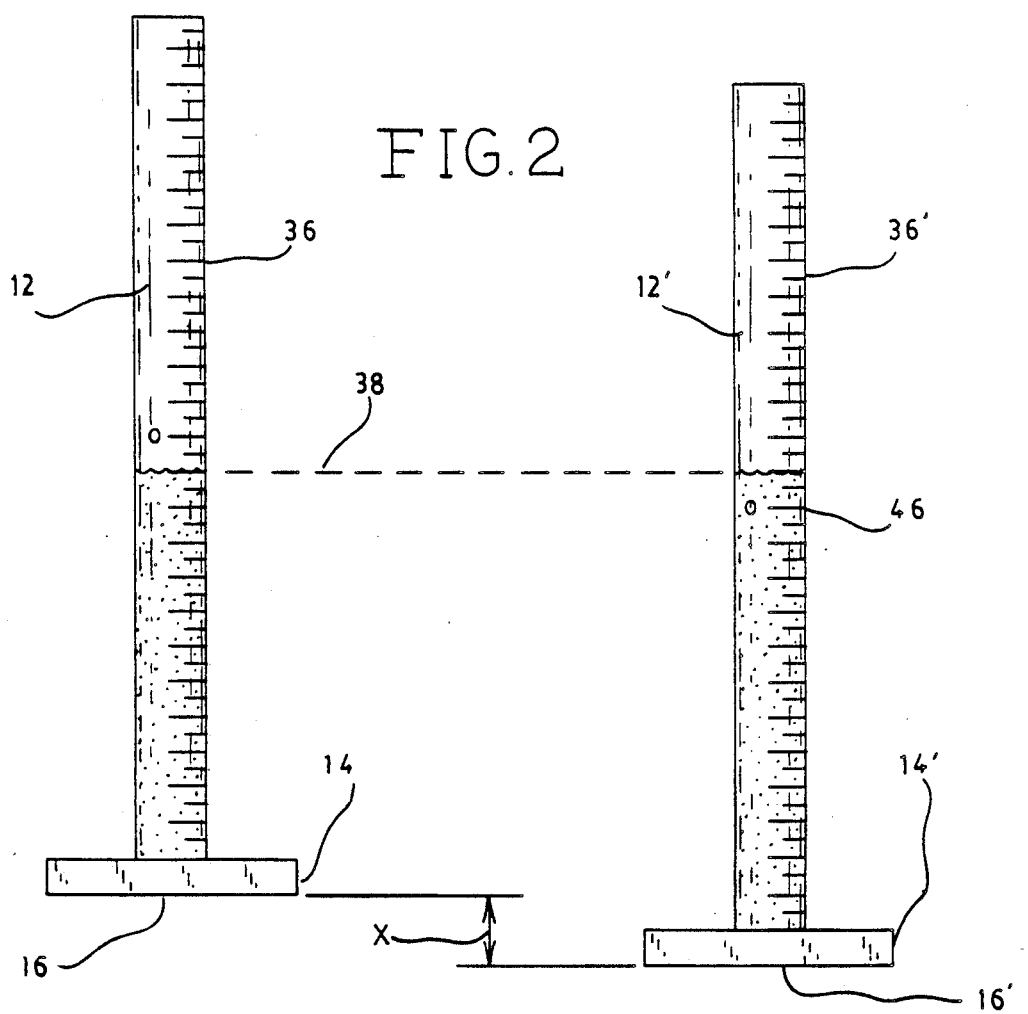
FIG. 2 provides a diagrammatic illustration of a measurement taken by the present system.
Figure 3:
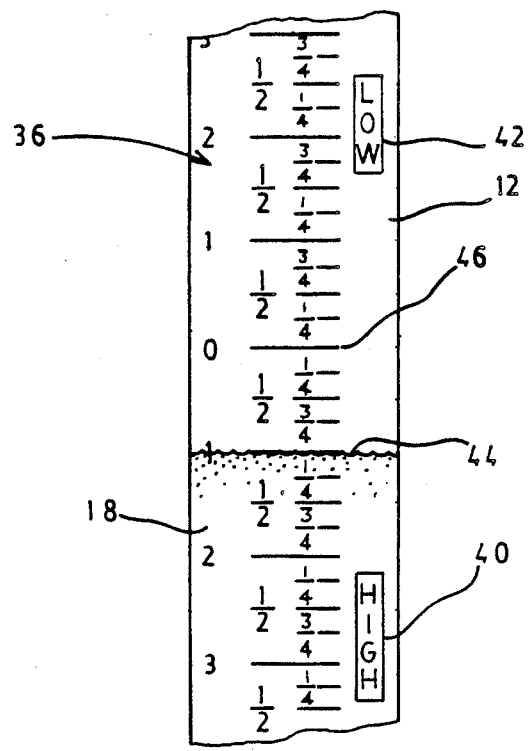
FIG. 3 provides an enlarged view depicting the technique used to measure the vertical displacement between two locations upon which the bottom of the base portions of the first and further instruments, respectively, rest.

As shown in the Figures, each of the tubes 18, 18' carries indicia means for determining the level of liquid within the tubes such that, in turn, the relative level of the liquid within the tubes can be determined. In this regard, an important feature of the present invention is the provision of linear measurement means carried along the lengths of the tubes at the locations 36 and 36' as shown in FIG. 1 which serve to allow a user to discern the distance in selected units of linear measure between the bottoms 16 and 16' of the first and further measuring instruments, respectively. This feature is illustrated more clearly in FIGS. 2 and 3. More specifically, it is important to be able to measure with the instruments 12 and 12' the distance indicated at "X" in FIG. 2 at the location of the bi-directional arrow. It will be noted that this distance "X" represents the vertical displacement between the bottom 16 and bottom 16' of the base portions 14 and 14' of the instruments 12 and 12', respectively. Not only does the present instrument provide an indication concerning the relative vertical displacement of one instrument with respect to the other, the instrument provides means carried by the tubes along their lengths such that a user can discern from the level of liquid within the instruments the distance represented by "X" in units of linear measure. In this regard, it will be noted in the diagrammatic illustration of FIG. 2 that with the lower portion of the instruments 12 an 12' connected in fluid communication as shown in FIG. 1, a vertical displacement of one instrument with respect to the other causes a shift in the level of liquid contained within the tubes 18 and 18'. As shown in FIG. 2, the overall level of fluid will remain the same in each tube as is indicated by the dotted line 38. However, the linear measurement means indicated at the locations 36 and 36' serve to provide information concerning the exact displacement represented by "X" in FIG. 2. Not only is the linear measurement provided, an indication as is shown in FIG. 3 serves to illustrate to a user whether the instrument 12 is higher or lower than the cooperating instrument 12'. While this may be obvious if the instruments are in close proximity, when the instruments are used at a construction site, they may be hundreds of feet apart and a user would not be able to tell which was higher.

In this regard, it will be noted that markings are provided at 40 and 42 which indicate the relative position of one instrument with respect to the other, or more specifically indicate whether the instrument is higher or lower than the cooperating instrument. It will be noted that the linear measurement means generally indicated at the location 36 has a zero line or mark 46 indicating the reference point for the linear measurement means 36. The measuring system 10 is initially calibrated by placing the instruments 12 and 12' on a level surface and filling them with liquid until the zero line 46 is marked by the liquid in each instrument. If the liquid level in the tube 18 is lower than the zero line 46, the bottom 16 is above the cooperating bottom 16' of instrument 12'. In a like manner, if the level of liquid is above the zero line 46, the user is provided with information that the instrument is lower than the cooperating instrument; or more specifically, the bottom 16' of the instrument 12' (see FIG. 2) is lower than the bottom 16 of the instrument 12.

Additionally, the liquid level 44 marks the linear measurement means at the location 36, and as is illustrated in FIG. 3, with an indication of the units of linear measurement corresponding with the displacement indicated at "X" in FIG. 2. In this regard, the tubes 18 and 18' are preferably transparent. Thus, if the liquid level 44 is as shown in FIG. 3, the user is provided instantaneously with information indicating that the instrument 12, or more specifically the bottom 16 of the instrument 12, is higher than the bottom 16 of the instrument 12' and that the value of "X" is one inch. Thus, by providing a scale with graduations in selected units of linear measurement, the reader can measure the exact difference between the vertical displacement between the instruments 12 and 12'. In this manner, a single user can discern and measure in selected units of linear measurement the vertical displacement between two horizontally spaced locations upon which the bottoms 16 and 16' rest.

The scale used on the prototype was one-half inch equals one inch, i.e., a one-half inch shift in the water level in the tube represented a one inch shift in "X".

Figure 4:
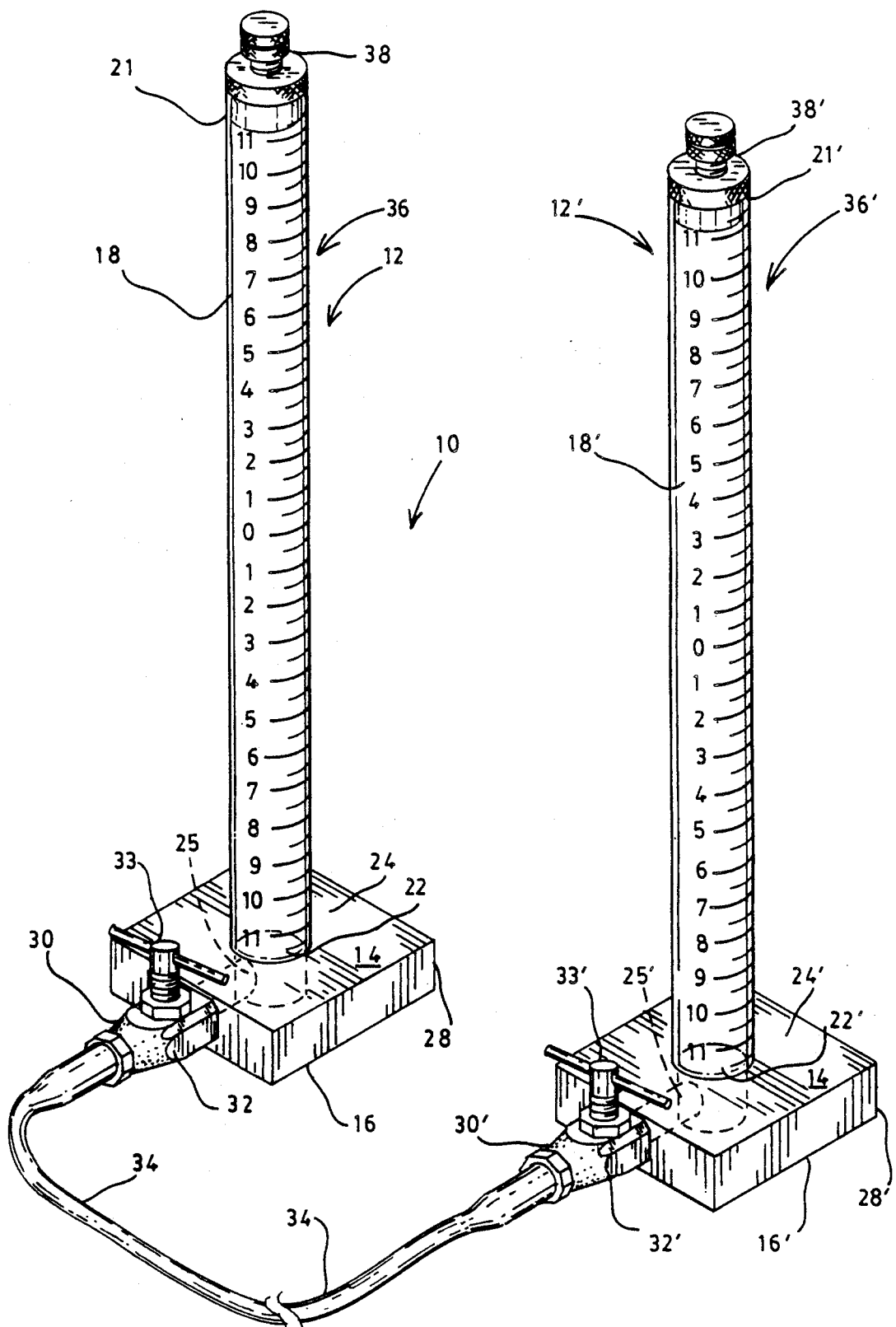
FIG. 4 illustrates a perspective view of an alternate embodiment of an open circuit measuring device of the present invention.

In FIG. 4 an alternate embodiment of the open circuit measuring system of the present invention is illustrated generally at 10'. For convenience, structures which are common to both the system 10 and the system 10' are referenced by common numerals, and it will be recognized that the system 10' functions in the same manner as described above with respect to the system 10. However, the alternate embodiment of FIG. 4 is provided with certain features that enhance its portability.

In the system 10' the couplings 30 and 30' of the tubes 18 and 18' each include a first selectively closable valve means for selectively terminating the flow of liquid between the bores 25, 25' and the tube means 34. In one preferred embodiment such means includes the petcocks 32 and 32' which are opened and closed through the rotation of the actuators 33 and 33', respectively. However, it will be understood that various selectively closable valves can be used if desired. Further, each of the tubes 18 and 18' is provided with a second selectively closable valve means, such as, for example, the valve assembly 39, for sealing the access openings 21 and 21' of the tubes 18 and 18'.

Figure 5:
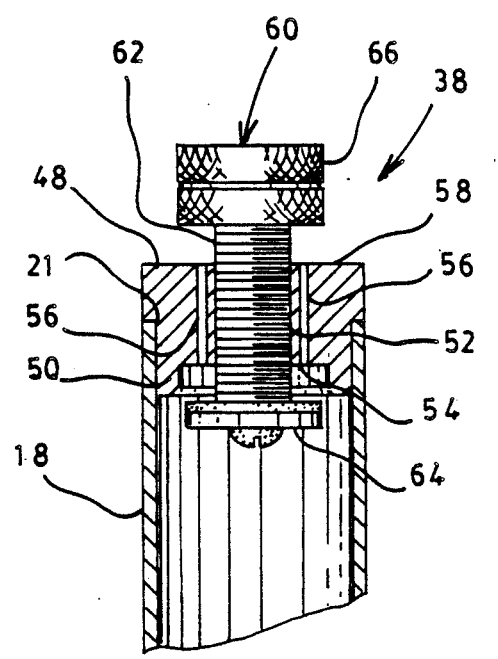
FIG. 5 illustrates a partial side elevation view, in section, of an alternative embodiment of an open circuit measuring device of the present invention.

As illustrated in FIG. 5, the valve assembly 39 each includes a body 48 having a lower portion 50 which is secured in the operatively associated opening 21, 21'. The body 48 is provided with a threaded receptor 52 extending therethrough and a valve seat 54 disposed in the operatively associated lower portion 50, 50' so as to be coaxial with respect to the receptor 52. Further, the body defines one or more venting conduits 56 extending between the upper surface 58 of the body 48 and the valve seat 54. Also, the valve assemblies 38 and 38' each includes a valve unit 60 having a threaded valve stem 62 for being threadably received in the receptor 52, and valve member 64 mounted on the lower end portion of the stem 62 for engaging the valve seat 54. A manipulating member, such as the knurled knob 66, is also provided for selectively rotating the stem 62 so as to move the valve member 64 into and out of contact with the valve seat, whereby the venting conduits are selectively sealed and unsealed.

Thus, it will be recognized that when the system 10' is being transported or otherwise not in use the petcocks 32 and 32' are closed to seal the bores 25 and 25' and the venting conduits 56 of the valve assemblies 39 are closed, thereby sealing the liquid within the measuring instruments 12 and 12'. However, when the system is to be used the petcocks 32 and 32' are opened to allow liquid to flow between the instruments 12 and 12' and the venting conduits 56 are opened to vent the tubes 18 and 18' to the ambient atmosphere. Moreover, it will be recognized that in order to serve the purpose of venting the tubes 18 and 18' the conduits 56 can be small in diameter, such that even during use the valve assemblies 39 serve to prohibit liquid from being inadvertently lost through the openings 21 and 21' should the instruments 12 and/or 12' be turned over.

From the foregoing detailed description, it will be recognized that an improved open circuit measuring system has been provided. This measuring system serves to measure the vertical displacement in selected units of linear measurement such as inches or feet in the United States system, between selected locations upon which the bottoms 16 and 16' of the instruments 12 and 12', respectively, rests. The internal diameter of the tubes 18 and 18' and the scale of the linear measurement means are selected such that the level of the liquid within the tubes corresponds with the selected units of linear measurement such as inches or feet in the United States system. Thus, single users can place the measuring instruments at selected locations and discern whether one tube is higher or lower than the other, and further discern the vertical displacement between the bottoms of the instruments.

While a preferred embodiment has been shown and described, it will be understood that there is no intent to limit the invention to such disclosure, but rather it is intended to cover all modifications and alternate constructions falling within the spirit and scope of the invention as defined in the appended claims and equivalents thereof.

I claim:

1. An open circuit fluid leveling measuring system comprising:
    first and further cooperating measuring instruments, each including a base portion having a bottom and an upright tube defining a chamber for containing a liquid, said tubes having a lower portion with an access opening communicating with the liquid and having an upper end portion defining an access opening to the atmosphere;
    an operator actuated first valve means for selectively sealing said access openings in said lower end portions of said tubes and a second valve means in a body mounted in the access openings of said upper end portions of said tubes selectively venting said chamber of each said tube to the ambient atmosphere, whereby said operator can selectively seal said access openings of each of said tubes when said measuring system is not in use, notwithstanding the orientation of said tubes;
    flexible means providing fluid communication via said access openings between said chambers of said tubes proximate said lower end portions of said tubes; and
    indicia means carried by each said tube for determining the level of said liquid in each said tube whereby the relative level of said liquid in said tubes can be determined as displaced in selected and spaced locations.

2. The open circuit measuring system of claim 1 wherein each said measuring instrument includes a second valve means for selectively terminating fluid communications between said chamber of said tube and said flexible means.

3. The open circuit measuring system of claim 2 wherein said second valve means comprises a petcock carried by each said measuring instrument.

4. An open circuit fluid leveling measuring system comprising:
    first and further cooperating measuring instruments, each including a base portion having a bottom and an upright tube defining a chamber for containing a liquid, said tubes having a lower portion with an access opening communicating with said liquid and having an upper end portion defining an access opening to the atmosphere;
    an operator actuated first valve means operatively associated with each said tube for selectively sealing said access openings of said tubes and selectively venting said chamber of each said tube to the ambient atmosphere, whereby said operator can selectively seal said access openings of said tubes when said measuring system is not in use, each said first valve means including a body having an upper surface and lower portion for being closely received in said access openings of said operatively associated tube, said body being provided with a threaded receptor therethrough and a valve seat defined by said lower portion of said body, said body further defining at least one venting conduit extending between said upper surface of said body and said valve seat, each said first valve means further including a valve unit having a threaded valve stem for being threadably received in said threaded receptor of said body, and having a valve member mounted on a lower end portion of said valve stem for engaging said valve seat and a manipulating member mounted at an upper end portion of said valve stem for selectively rotating said valve stem and moving said valve member into and out of contact with said valve seat for selectively opening and closing said venting conduit;
    flexible means providing fluid communication via said access openings between said chambers of said tubes proximate said lower end portions of said tubes;
    a second valve means for selectively terminating fluid communications between said chamber of said tube and said flexible means; and
    indicia means carried by each said tube for determining the level of said liquid in each said tube whereby the relative level of said liquid in said tubes can be determined as displaced in selected and spaced locations.

5. The open circuit measuring system of claim 1 wherein said indicia means includes linear measuring means disposed along the lengths of said tubes identifying selected units of linear measure whereby the relative vertical displacement of said bottom of said first measuring instrument and said bottom of said further measuring instrument can be determined in said selected units of linear measure.

6. The open circuit measuring system of claim 5 wherein said linear measuring means includes a preselected mark disposed substantially midway the length of each said tube and a selected distance from said bottom of said base portion operatively associated therewith for indicating the level of said liquid within said tubes when said bottoms of said base portions of said measuring instruments are at a common vertical level, and wherein said indicia means of each said tube includes the term "low" disposed above said preselected mark and the term "high" disposed below said preselected mark whereby the relative vertical position of said bottom of one said measuring instrument with respect to said bottom of the other said instrument is immediately discernable.

* * * * *